(12) United States Patent
Hirota et al.

(10) Patent No.: US 9,156,439 B2
(45) Date of Patent: Oct. 13, 2015

(54) AUTOMATIC OPENING AND CLOSING APPARATUS OF OPENING AND CLOSING MEMBER FOR VEHICLE AND STRUCTURAL MEMBER INCLUDED IN VEHICLE

(71) Applicant: AISIN SEIKI KABUSHIKI KAISHA, Kariya-shi (JP)

(72) Inventors: Koichi Hirota, Takahama (JP); Shintaro Suzuki, Kasugai (JP); Hitoshi Takayanagi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/069,978

(22) Filed: Nov. 1, 2013

(65) Prior Publication Data

US 2014/0142815 A1    May 22, 2014

(30) Foreign Application Priority Data

Nov. 21, 2012  (JP) ................................. 2012-255339
Oct. 23, 2013  (JP) ................................. 2013-219859

(51) Int. Cl.
| | | |
|---|---|---|
| *E05B 81/78* | (2014.01) | |
| *B60R 25/24* | (2013.01) | |
| *G07C 9/00* | (2006.01) | |

(52) U.S. Cl.
CPC .......... *B60R 25/246* (2013.01); *G07C 9/00309* (2013.01); *G07C 2009/00793* (2013.01); *G07C 2209/08* (2013.01); *G07C 2209/64* (2013.01)

(58) Field of Classification Search
CPC ........ E05B 81/77; E05B 81/78; B60R 25/246
USPC ......................................... 701/49; 296/146.1
See application file for complete search history.

(56) References Cited

U.S. PATENT DOCUMENTS

| | | | | |
|---|---|---|---|---|
| 6,377,009 B1* | 4/2002 | Philipp | .......................... | 318/468 |
| 6,856,239 B1* | 2/2005 | Hicks | .............................. | 340/5.7 |
| 8,091,280 B2* | 1/2012 | Hanzel et al. | ..................... | 49/25 |

(Continued)

FOREIGN PATENT DOCUMENTS

| | | | |
|---|---|---|---|
| JP | 2005-133529 A | 5/2005 | |
| JP | 2005-307692 A | 11/2005 | |
| JP | 2013-028903 A | 2/2013 | |

OTHER PUBLICATIONS

Miyake et al., U.S. Appl. No. 14/009,282, entitled "Vehicle Open/Close Body Operating Apparatus" filed Oct. 1, 2013.

*Primary Examiner* — Mary Cheung
*Assistant Examiner* — Michael Berns
(74) *Attorney, Agent, or Firm* — Buchanan Ingersoll & Rooney PC

(57) ABSTRACT

An automatic opening and closing apparatus of an opening and closing member for a vehicle includes an opening and closing member driving portion, a receiving portion configured to receive a radio signal transmitted from a radio transmitter and indicating identification information for identifying the vehicle, a non-contact detection sensor including a detection range that is specified to an inner side than an outermost position of the vehicle in a direction towards an outer side of a vehicle interior from the opening and closing member in a state where the opening and closing member is closed, and a control portion configured to control the opening and closing member driving portion in a case where the non-contact detection sensor detects an object in a state where the identification information is correlated to the vehicle on a basis of the radio signal received from the radio transmitter.

14 Claims, 7 Drawing Sheets

(56) References Cited

U.S. PATENT DOCUMENTS

| | | | |
|---|---|---|---|
| 2003/0216817 A1* | 11/2003 | Pudney | 700/17 |
| 2008/0296926 A1* | 12/2008 | Hanzel et al. | 296/146.1 |
| 2011/0248820 A1* | 10/2011 | Gehin | 340/5.72 |
| 2011/0248821 A1* | 10/2011 | Merten | 340/5.74 |

\* cited by examiner

AUTOMATIC OPENING AND CLOSING APPARATUS OF OPENING AND CLOSING MEMBER FOR VEHICLE AND STRUCTURAL MEMBER INCLUDED IN VEHICLE

CROSS REFERENCE TO RELATED APPLICATIONS

This application is based on and claims priority under 35 U.S.C. §119 to Japanese Patent Application 2012-255339, filed on Nov. 21, 2012 and Japanese Patent Application 2013-219859, filed on Oct. 23, 2013, the entire content of which is incorporated herein by reference.

TECHNICAL FIELD

This disclosure generally relates to an automatic opening and closing apparatus of an opening and closing member for a vehicle and a structural member included in a vehicle.

BACKGROUND DISCUSSION

A method for opening and closing an opening and closing member of a vehicle by using a portable radio transmitter has been developed. For example, JP2005-307692A, which will be hereinafter referred to as Reference 1, discloses an automatic opening and closing system of a power back door (i.e., back door) for a vehicle. In the opening and closing system disclosed in Reference 1, a back door opening and closing operation detection portion is provided at an exterior of a vehicle for detecting a motion of a user related to an opening and closing operation of the back door by the user's hand or arm, for example (i.e., detecting a back door opening and closing operation by the user). In a case where the back door opening and closing operation detection portion detects a predetermined back door opening and closing operation by the user in a state where an ID included in a signal transmitted by a radio transmitter and an ID held by the vehicle match each other, a back door opener is controlled to perform the opening and closing operation of the back door. According to the automatic opening and closing system disclosed in Reference 1, the back door opening and closing operation detection portion is formed by a touch sensor that generates a capacitance when the user touches the sensor and the capacitance that is generated is converted to a pulse signal. Alternatively, the back door opening and closing operation detection portion is formed by a sensor detecting the user's motion in a non-contact manner, for example, by an infrared sensor, an ultrasonic sensor, a heat sensor, or an image recognition system.

In addition, JP2005-133529A, which will be hereinafter referred to as Reference 2, discloses an opening and closing member operation apparatus for a vehicle. In the opening and closing member operation apparatus disclosed in Reference 2, an intentional operation by the user for opening or closing a door is detected by a leg portion detection sensor provided at a lower surface of a vehicle body of the vehicle, for example, at a lower surface of a sill cover or a rear bumper, to thereby open or close the door in a non-contact manner. The leg portion detection sensor is configured to emit radio wave or infrared radiation downwardly of the vehicle to detect in the non-contact manner that the user's leg is placed between the vehicle body and a ground surface as the intentional operation of the user. In a case where the leg portion detection sensor detects the user's leg, for example, in a state where an ID included in a signal transmitted by a radio transmitter and an ID held by the vehicle match each other, an actuator is operated to open or close the door. In the opening and closing member operation apparatus disclosed in Reference 2, the door is inhibited from being opened or closed when the user simply approaches the vehicle, and the door is opened or closed when the user places one's leg intentionally between the ground surface and the lower surface of the vehicle.

In Reference 1, in order to detect the user's motion related to the opening and closing operation in the non-contact manner, the back door opening and closing operation detection portion needs to be a non-contact detection sensor, for example, an infrared sensor, an ultrasonic sensor, an image recognition system, or a heat sensor. In this case, when a non-contact detection distance is specified longer so as to obtain an advantage of the non-contact detection sensor, the back door opening and closing operation may be wrongly performed (i.e., wrong operation of the door) in a state where a person who does not intend to operate the vehicle (the back door) simply passes through near the vehicle.

In Reference 2, the leg portion detection sensor is provided at the lower surface of the vehicle. Thus, it is considered that the aforementioned wrong operation that may be caused in Reference 1 may not occur in a state where a person who does not intend to operate the vehicle simply passes through near the vehicle. Nevertheless, because a detection range of the leg portion detection sensor is defined from the lower surface of the vehicle to the ground surface, a motion of an animal, for example, a cat or a dog that passes through the detection range may be detected. In addition, in a case where a grass or plant, for example, grows within the detection range of the leg portion detection sensor, such grass or plant may be wrongly detected as the user's leg (leg portion) placed into the detection range as the intentional operation of the user. The detection range of the leg portion detection sensor is specified to be a narrow void between the lower surface of the vehicle and the ground surface. Then, an animal may pass through the detection range or a grass or plant may grow from the ground within the detection range. Further, an object that causes reaction of the leg portion detection sensor may be placed within the detection range. In such case, the non-contact detection as a trigger for starting the opening and closing operation of the door may be wrongly conducted. That is, depending on circumstances of the ground at the lower side of the vehicle (for example, animals, grasses or objects causing the sensor to react), the wrong operation of the leg portion detection sensor may occur.

In addition, in Reference 2, the leg portion detection sensor is provided at the lower surface of the vehicle, i.e., at a place that cannot be seen from a side surface of the vehicle, so as not to generate the aforementioned trigger for the opening and closing operation of the door unless the user performs the intentional operation. Thus, Reference 2 produces effects that the opening and closing operation of the door is not initiated unless the user's leg, for example, is purposely placed into the void between the lower surface of the vehicle and the ground surface, and is not initiated in a state where a person who does not intend to operate the door simply approaches the side surface of the vehicle. Nevertheless, in order to produce the aforementioned effects, the leg portion detection sensor is necessarily provided at the lower surface of the vehicle serving as an area that is hidden from the side surface of the vehicle. Thus, in a case where the user who has the intention to operate the door attempts to make the leg portion detection sensor to detect one's leg as the intentional operation for opening or closing the door, it is difficult for the user to directly visually confirm the position of the leg portion detection sensor because the leg portion detection sensor is provided at the portion not to be seen from the side surface of the vehicle. The user may not be able to correctly place one's leg into the detection range of the leg portion detection sensor. In such case, the user needs to seek the detection range which cannot be seen for placing one's leg into the detection range, which may cause the user to feel troublesome.

Regarding the aforementioned issue, in Reference 2, the leg portion detection sensor is provided at a lower side of the position corresponding to the vicinity of a door outer handle that is positioned in the closed state of the slide door, so that the user may recognize the position of the leg portion detection sensor based on the position of the door outer handle. Nevertheless, even though the position or approximate position of the leg portion detection sensor may be indirectly recognized in the aforementioned case, the position of the leg portion detection sensor may not be directly visually confirmed. That is, the door outer handle visually confirmable and serving as an indication of the position of the leg portion detection sensor is physically separated from the actual position of the leg portion detection sensor. Therefore, the user is limited to simply guess or assume the approximate position of the leg portion detection sensor. Because the user is inhibited from directly observing a relative positional relationship between the user's leg as the detection target and an area at which the user assumes that the leg portion detection sensor is positioned, the user may place one's leg repeatedly to the same positions while seeking the detection range of the leg portion detection sensor based on the area at which the leg portion detection sensor is assumed to be positioned. Further, without the visual confirmation, it is difficult for the user to recognize or find an area to which the user's leg has not yet been positioned or placed. The user may feel troublesome while seeking the detection range.

A need thus exists for an automatic opening and closing apparatus of an opening and closing member for a vehicle and a structural member included in a vehicle, which are not susceptible to the drawback mentioned above.

SUMMARY

According to an aspect of this disclosure, an automatic opening and closing apparatus of an opening and closing member for a vehicle includes an opening and closing member driving portion configured to automatically open and close the opening and closing member mounted at the vehicle, a receiving portion configured to receive a radio signal transmitted from a radio transmitter and indicating identification information for identifying the vehicle, a non-contact detection sensor configured to detect an object in a non-contact manner and including a detection range that is specified to an inner side than an outermost position of the vehicle in a direction towards an outer side of a vehicle interior of the vehicle from the opening and closing member in a state where the opening and closing member is closed, and a control portion controlling the opening and closing member driving portion. The control portion is configured to control the opening and closing member driving portion in a case where the non-contact detection sensor detects an object in a state where the identification information is correlated to the vehicle on a basis of the radio signal received from the radio transmitter.

According to another aspect of this disclosure, a structural member included in a vehicle includes a non-contact detection sensor configured to detect an object in a non-contact manner. The non-contact detection sensor is configured to be inhibited from detecting an outer side than an outermost portion of the vehicle at a side portion of the vehicle at which the structural member is provided to face.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
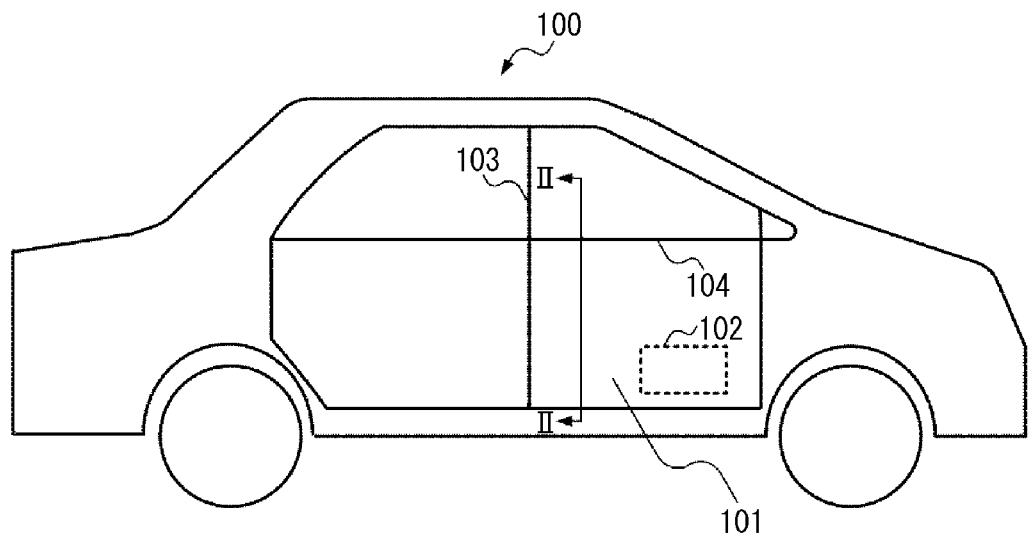
FIG. 1 is a side view of a vehicle according to a first embodiment disclosed here.

Embodiments of this disclosure will be explained with reference to the attached drawings. In the drawings, members including the same functions bear the same reference numerals and repetitive explanation may be omitted.

A first embodiment will be explained below. As illustrated in FIG. 1, a vehicle 100 includes a side door 101 serving as an opening and closing member configured to be opened and closed, a door opening and closing drive portion 102 serving as an opening and closing member driving portion automatically opening and closing the side door 101, and a center pillar 103. The side door 101 includes a belt molding 104 made of resin. The door opening and closing drive portion 102 is formed by an actuator, for example, operated by receiving an operation signal from a control unit.

Figure 2:
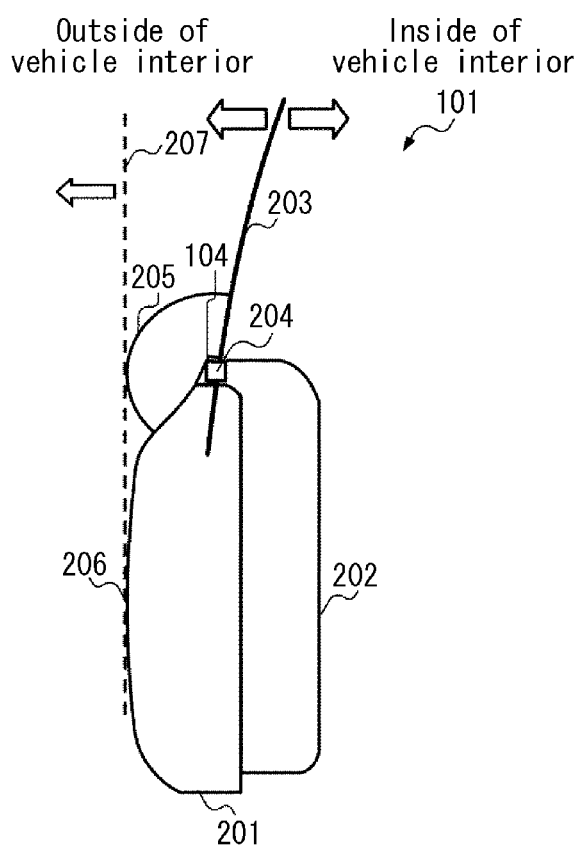
FIG. 2 is a schematic view illustrating a cross-section taken along line II-II in FIG. 1.

As illustrated in FIG. 2, the side door 101 includes, in addition to the aforementioned belt molding 104, a door panel 201, a door trim 202 provided at a vehicle interior side of the side door 101, a window glass 203 configured to be opened and closed, and a non-contact detection sensor 204 detecting a human body in a non-contact manner. According to the first embodiment, the non-contact detection sensor 204 is a capacitive sensor detecting a change in capacitance. Therefore, in the first embodiment, the non-contact detection sensor 204 may be also referred to as the capacitive sensor 204.

The capacitive sensor 204 is mounted to the belt molding 104 so as not to be exposed to an outside of the vehicle interior in a state where the belt molding 104 is assembled on the side door 101. The capacitive sensor 204 is covered by the belt molding 104 made of resin in a state where the belt molding 104 is assembled on the side door 101 and thus is inhibited from being viewed by a person who sees the vehicle 100. Specifically, the capacitive sensor 204 is mounted to a rear surface of a non-conductive member, for example, of a non-metallic member (i.e., a surface that is hidden when viewed from the outside of the vehicle 100 in a state where the non-conductive member is assembled on the vehicle 100). The capacitive sensor 204 is covered by the belt molding 104 (non-conductive member) from the outside of the vehicle interior of the vehicle 100.

According to the present embodiment, sensitivity of the capacitive sensor 204 is specified so as to achieve the non-contact detection and so as not to detect the outer side than an outermost position 206 of the side door 101 in a state where the capacitive sensor 204 that is covered by the belt molding 104 is mounted to the side door 101. Specifically, a detection range 205 of the capacitive sensor 204 is specified to the inner side than the outermost position 206, i.e., to the side in the vicinity of the side door 101. In a case where the capacitive sensor 204 detects an object, for example, the user's hand or elbow, within the detection range 205 specified in the aforementioned manner while the capacitive sensor 204 is operating, the capacitive sensor 204 transmits a detection signal to a control unit 301. According to the present embodiment, the user who intends to open or close the side door 101 inputs a command for starting an opening and closing operation of the side door 101 as the detection signal by causing the capacitive sensor 204 to detect an object, for example, detect the user's hand or elbow.

The aforementioned outermost position 206 is arranged at an outermost area of the vehicle 100 relative to a reference area at the vehicle interior side, for example, the door trim 202, of the side door 101 serving as the opening and closing member. The "outer side than the outermost position 206 of the side door 101" corresponds to an opposite side of the side door 101 relative to an imaginary line 207 serving as a tangent line of the outermost position 206 of the side door 101 (i.e., an outer side of the imaginary line 207). Therefore, the side closer to the side door 101 relative to the imaginary line 207 corresponds to the "inner side than the outermost position 206 of the side door 101". The capacitive sensor 204 according to the present embodiment is configured to detect the inner side than the outermost position 206 of the side door 101.

Figure 3:
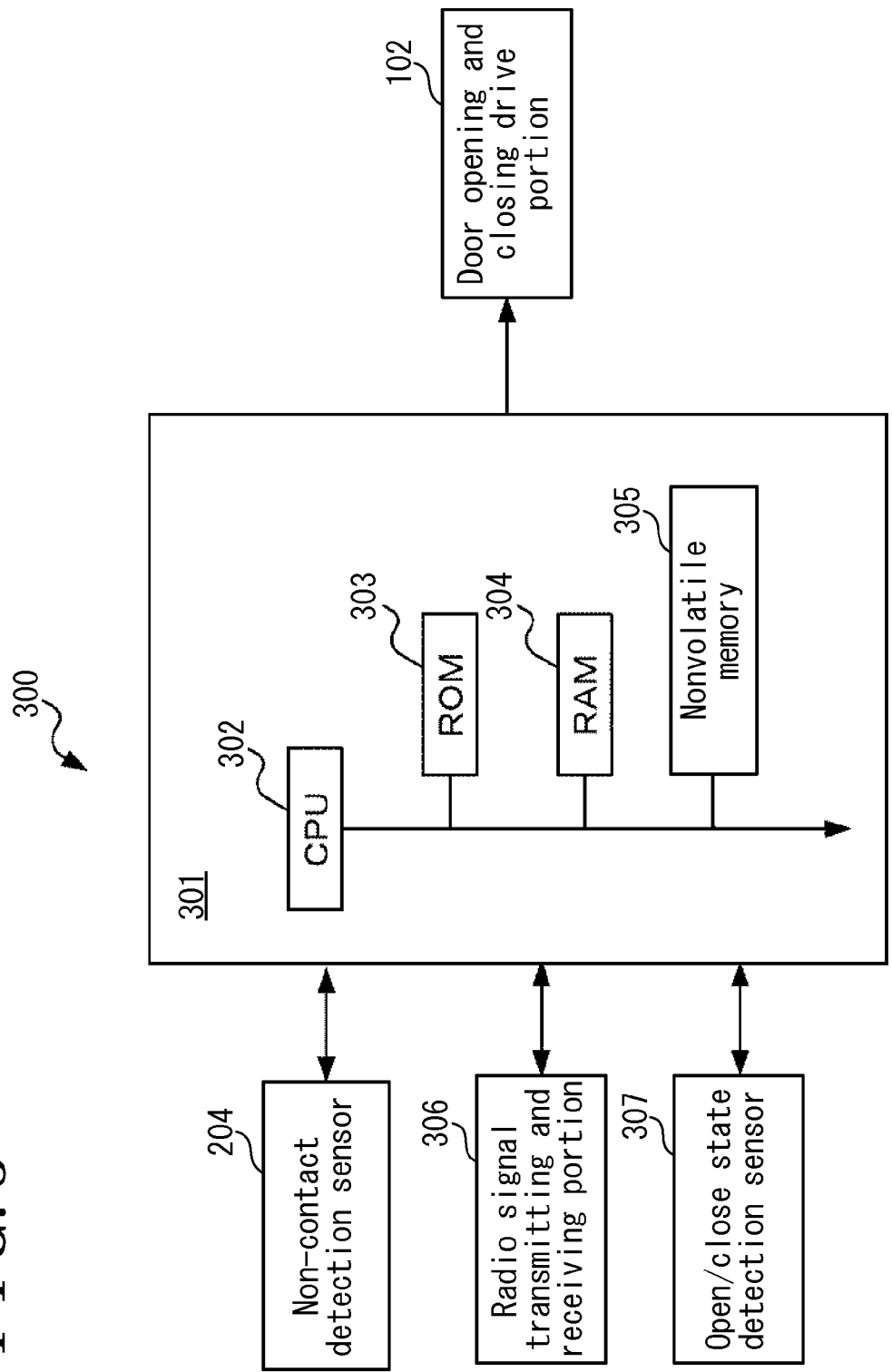
FIG. 3 is a schematic diagram of an automatic opening and closing apparatus of an opening and closing member for a vehicle according to the first embodiment.

As illustrated in FIG. 3, an automatic opening and closing apparatus 300 includes the door opening and closing drive portion 102, the capacitive sensor 204 provided at the side door 101 and serving as the non-contact detection sensor, the control unit 301, a radio signal transmitting and receiving portion 306 serving as a receiving portion and receiving and transmitting a radio signal relative to a radio transmitter, and an open/close state detection sensor 307 detecting an open/close state of the side door 101.

The control unit 301 serves as a control portion controlling the entire automatic opening and closing apparatus 300. The control unit 301 may also control other structures of the vehicle 100. The control unit 301 includes a CPU 302 performing operations including various calculations, controls, and determinations, for example, and a ROM 303 storing various control programs (for example, program illustrated in FIG. 4) performed by the CPU 302. The control unit 301 also includes a RAM 304 temporarily storing data during the operation of the CPU 302 and input data, and a nonvolatile memory 305 corresponding to flash memory or SRAM, for example. The door opening and closing drive portion 102, the non-contact detection sensor 204, the radio signal transmitting and receiving portion 306, and the open/close state detection sensor 307 are electrically connected to the control unit 301. The nonvolatile memory 305 stores an ID (identification) for identifying the vehicle 100.

The radio signal transmitting and receiving portion 306 transmits an ID information request signal to the outside of the vehicle 100 at a predetermined time interval (i.e., transmission time interval). In addition, the radio signal transmitting and receiving portion 306 receives an ID information signal transmitted from a predetermined radio transmitter. The radio transmitter that is provided separate from the vehicle 100 corresponds to a portable device including wireless capabilities. For example, the radio transmitter corresponds to a portable key, smartphone, or a tablet computer including communication capabilities such as radio communication, for example. The radio transmitter includes an ID information (identification information) indicating an ID of a predetermined vehicle (i.e., the vehicle 100 according to the present embodiment) at a memory portion. When receiving the ID information request signal, the radio transmitter transmits the ID information signal including the ID Information for identifying the predetermined vehicle stored at the memory portion. The radio signal transmitting and receiving portion 306 is configured to receive the ID information signal accordingly.

The open/close state detection sensor 307 detects whether the side door 101 is opened (i.e., in an open state) or closed (i.e., in a closed state) by following a detection start command from the control unit 301 and transmits an open/close state signal that indicates the open/close state of the side door 101 to the control unit 301.

The door opening and closing drive portion 102 drives the side door 101 to automatically open or close on a basis of the operation signal received by the control unit 301. For example, in a case where the operation signal indicates an instruction to open the side door 101, the door opening and closing drive portion 102 operates to open the side door 101. On the other hand, in a case where the operation signal indicates an instruction to close the side door 101, the door opening and closing drive portion 102 operates to close the side door 101.

Figure 4:
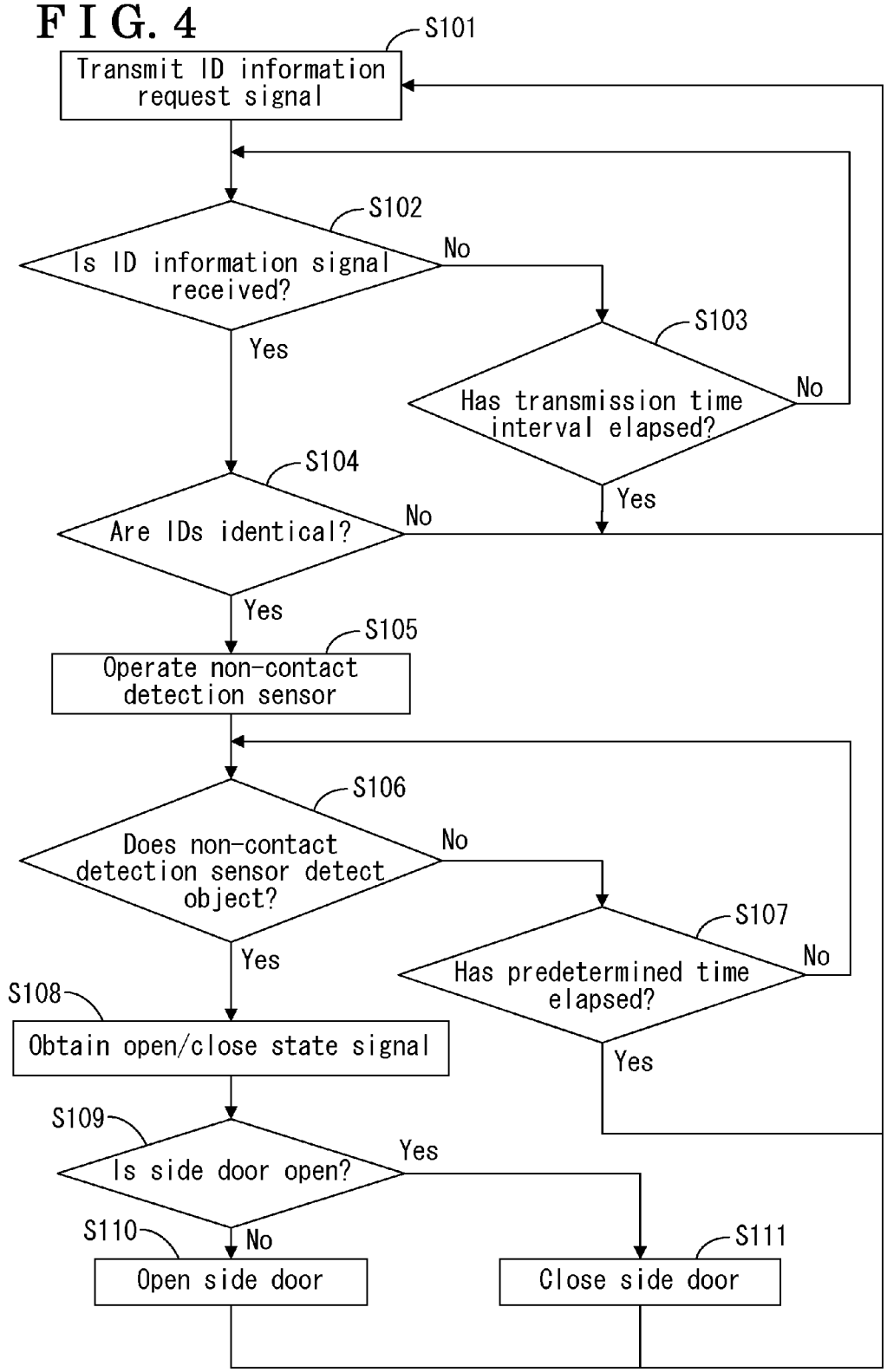
FIG. 4 is a flowchart illustrating procedures of an automatic opening and closing operation of the opening and closing member according to the first embodiment.

FIG. 4 is a flowchart indicating procedures of an automatic opening and closing operation of the side door 101 according to the present embodiment. In step S101 (hereinafter "step" will be omitted), the control unit 301 controls the radio signal transmitting and receiving portion 306 to transmit the ID information request signal. In S102, the control unit 301 determines whether or not the radio signal transmitting and receiving portion 36 receives the ID information signal. That is, in a case where the radio signal transmitting and receiving portion 306 receives a predetermined ID information signal and transmits the signal to the control unit 301, the control unit 301 determines that the ID information signal is received and the operation proceeds to S104. On the other hand, in a case where the ID information signal is not transmitted from the radio signal transmitting and receiving portion 306, the control unit 301 determines that the ID information signal is not received and the operation proceeds to S103. In S103, the control unit 301 determines whether or not the transmission time interval has elapsed from the operation in S101. For example, the control unit 301 refers to a time measuring device such as a timer, for example. In a case where the control unit 301 determines that the transmission time interval has elapsed from the transmission of the ID information request signal, the operation returns to S101. In a case where the transmission time interval has not elapsed, the operation returns to S102.

In S104, the control unit 301 extracts the ID information from the ID information signal received by the radio signal transmitting and receiving portion 306 to match the ID information to the ID stored at the nonvolatile memory 305. Then, the control unit 301 determines whether or not the ID information received by the radio signal transmitting and receiving portion 306 is identical to the ID held by the control unit 301. That is, it is determined whether or not the ID information included in the ID information signal received by the radio signal transmitting and receiving portion 306 is correlated to the vehicle, i.e., to the ID information held by the vehicle 100. In a case where the ID information included in the received ID information signal is identical to the ID information of the control unit 301 (i.e., of the vehicle 100), the operation proceeds to S105. On the other hand, in a case where the ID information is not identical, the operation returns to S101.

In S105, the control unit 301 controls the capacitive sensor 204 serving as the non-contact detection sensor to operate so that the capacitive sensor 204 is brought in a sensing ready state. In S106, the control unit 301 determines whether or not the capacitive sensor 204 detects any object. For example, in a case where a user (for example, a person carrying a radio transmitter that stores the ID of the vehicle 100) who intends to open or close the side door 101 places one's hand within the detection range 205, the capacitive sensor 204 detects the user's hand to thereafter transmit the detection signal to the control unit 301. When receiving the detection signal from the capacitive sensor 204, the control unit 301 determines that the capacitive sensor 204 detects a start command for the opening and closing operation by the user. The operation proceeds to S108 accordingly. On the other hand, in a case where the control unit 301 does not receive the detection signal in S106, the operation proceeds to S107. In program illustrated in FIG. 4, in a case where the control unit 301 receives the aforementioned detection signal from the capacitive sensor 204, the control unit 301 stops the operation of the capacitive sensor 204.

In S107, the control unit 301 determines whether or not a predetermined time has elapsed from the operation start of the capacitive sensor 204 in S105. In a case where the control unit 301 determines, by referring to a timer, for example, that the predetermined time has not elapsed, the operation returns to S106. When the predetermined time has elapsed, the operation returns to S101. In a case where the program illustrated in FIG. 4 returns to S101, the control unit 301 stops the operation of the capacitive sensor 204.

In S108, the control unit 301 transmits the detection start command to the open/close state detection sensor 307 so that the open/close state detection sensor 307 detects whether the side door 101 is opened or closed (i.e., the side door 101 is in the open state or in the closed state). Then, the control unit 301 acquires the open/close state signal that indicates the detection result from the open/close state detection sensor 307. The open/close state signal serves as a signal indicating the open state in a case where the side door 101 is opened and serves as a signal indicating the closed state in a case where the side door 101 is closed.

In S109, the control unit 301 determines whether the side door 101 is opened or closed on a basis of the open/close state signal acquired in S108. In a case where the side door 101 is in the closed state, the control unit 301 controls the door opening and closing drive portion 102 to automatically open the side door 101 in S110. In a case where the side door 101 is in the open state, the control unit 301 controls the door opening and closing drive portion 102 to automatically close the side door 101 in S111. Accordingly, in a case where the ID held by the radio transmitter for identifying the vehicle 100 and the ID held by the vehicle 100 that receives the radio signal (ID information signal) from the radio transmitter are identical to each other on a basis of the radio signal from the radio transmitter, the automatic opening and closing apparatus 300 establishes the detection range 205 which is limited to the inner side than the outermost position 206 of the side door 101 and to which the user inputs the command for the opening and closing operation of the side door 101 in the non-contact manner. In a case where the object, i.e., the user's hand or elbow that the user intentionally places, is detected within the detection range 205, the opening and closing operation of the side door 101 is automatically performed.

According to the present embodiment, the detection range 205 of the non-contact detection sensor 204 for detecting the command of the automatic opening and closing operation of the side door 101 by the user is specified to the inner side than the outermost position 206 of the side door 101 serving as a portion of the vehicle 100 in a case where the ID information acquired by the radio transmitter and the ID held by the vehicle 100 match each other. Thus, a person who simply passes through the vicinity of the vehicle 100 and does not intend to open or close the side door 101 may be inhibited from being wrongly detected. Because the vicinity of the belt molding 104 at which the capacitive sensor 204 is mounted is positioned at the inner side than the outermost position 206 (i.e., closer to the vehicle 100) corresponding to the outermost position of the vehicle 100 in the outward direction thereof in which the belt molding 104 faces or opposes, a person who simply passes through near the vehicle 100 is unlikely to put one's hand into the detection range 205. That is, the person who passes through the vicinity of the vehicle 100 is unlikely to place one's hand to the detection range 205 and is inhibited to place one's hand, for example, to the detection range 205 without intention. The detection range 205 of the non-contact detection sensor 204 is specified to a limited area, i.e., the inner side than the outermost position 206, so that a case where a predetermined operation of the person who does not intend to automatically open or close the side door 101 is wrongly detected as the command for the automatic opening and closing operation may be reduced.

In addition, according to the present embodiment, the capacitive sensor 204 is hidden and covered by the belt molding 104. Thus, without deteriorating the original appearance of the vehicle 100, i.e., the appearance before the capacitive sensor 204 is attached to a vehicle body of the vehicle 100, the detection of the command for starting the automatic opening and closing operation may be performed. In a case where a metallic material is used to cover or hide the non-contact detection sensor that detects the command for the automatic opening and closing operation, an electric flux line is shielded by the metallic material so that the capacitance is impossible to be measured. According to the present embodiment, however, the belt molding 104 serving as a non-conductive member is used to hide or cover the capacitive sensor 204. Therefore, while the capacitance is measurable, designability of the vehicle 100 may not be deteriorated. According to the present embodiment, the belt molding 104 includes a function to cover or hide the capacitive sensor 204 from the user, in addition to an original function, i.e., a water drip function. That is, without providing a specific structure for hiding or covering the capacitive sensor 204 so as to ensure the appearance of the vehicle 100, designability of the vehicle 100 may be maintained and assured by the belt molding 104 including a simple configuration and provided regardless of whether or not the capacitive sensor 204 is mounted to the vehicle 100.

Further, according to the present embodiment, the non-contact detection sensor 204 is provided at the position at which the belt molding 104 is provided. That is, the detection range 205 is inhibited from being established between the lower surface of the vehicle 100 and the ground surface. Even in a case where an animal suddenly passes below the vehicle 100, a case where a grass or plant grows below the vehicle 100 that is stopped, or a case where an object that causes the non-contact detection sensor 204 to react is placed below the vehicle 100, for example, the non-contact detection sensor 204 is inhibited from generating the detection signal by reacting to the aforementioned animal, grass, or object. An issue related to the wrong operation of the non-contact detection sensor 204 depending on circumstances of the ground surface below the vehicle 100 may be eliminated.

Furthermore, according to the present embodiment, the capacitive sensor 204 serving as the non-contact detection sensor is inhibited from being exposed to the outside of the vehicle interior by means of the belt molding 104. Even in the aforementioned state, the user may visually recognize an approximate position of the capacitive sensor 204. That is, the user may directly observe an area at which the capacitive sensor 204 is expected to be positioned. Thus, in a case where the automatic opening and closing operation is not started even by the user placing one's hand within the area that is believed to be the detection range 205 by the user, the user may find the detection range 205 while moving one's hand based on the visual confirmation. The user may be inhibited from placing one's hand repeatedly to the same positions or places. In addition, the user may easily recognize an area to which the user has not placed one's hand. The user may be restrained from feeling uncomfortable while finding the detection range 205 by moving one's hand. That is, the user may find the detection range 205 by directly observing an area to which the user places one's hand. The automatic opening and closing operation of the side door 101 may be easily conducted accordingly.

Although the area in the vicinity of the belt molding 104 at the inner side than the outermost position 206 of the side door 101 is visually confirmable by the user, the user is normally unlikely to place one's hand to the aforementioned area. Therefore, the non-contact detection sensor 204 that is provided at the aforementioned area so that the detection range 205 of the non-contact detection sensor 204 is specified to the inner side than the outermost position 206 of the side door 101 simplifies the automatic opening and closing operation while reducing the wrong detection that a person who does not intend to open or close the side door 101 is wrongly detected.

The area which is visually confirmable by the user but to which the user is normally unlikely to place one's hand, for example, corresponds to pillars including the center pillar 103, a front pillar, and a rear pillar. In a case where the capacitive sensor 204 serving as the non-contact detection sensor is provided at the center pillar 103, for example, the capacitive sensor 204 may be covered by a non-conductive garnish to ensure designability. Even in a case where the non-contact detection sensor is provided at each of the pillars, i.e., at the center pillar 103, for example, the detection range 205 is specified to the inner side than the outermost position 206 of the side door 101.

Figure 5:
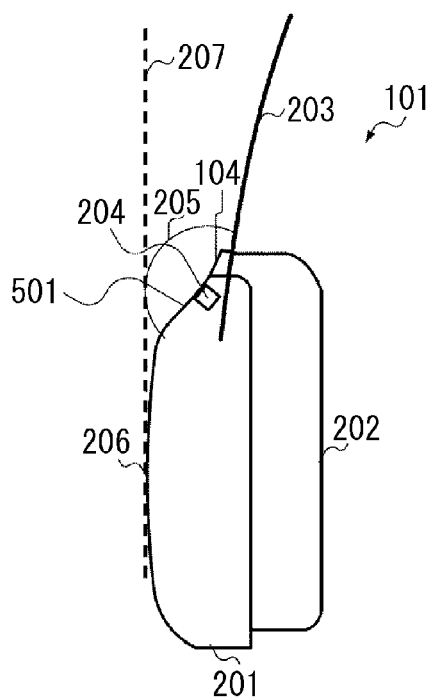
FIG. 5 is a schematic view illustrating a cross-section of a side door according to a modified example of the first embodiment.

In addition, the area which is visually confirmable by the user but to which the user is normally unlikely to place one's hand, for example, corresponds to a dent portion of the door panel 201. As illustrated in FIG. 5, according to a modified example of the first embodiment, the door panel 201 includes a dent portion 501 of which thickness is gradually decreasing towards an area at which the window glass 203 is inserted, i.e., an area at which the belt molding 104 is provided. In FIG. 5, the capacitive sensor 204 is provided to be embedded in the door panel 201 at the dent portion 501. That is, the capacitive sensor 204 is covered by the door panel 201 and is hidden from the outside of the vehicle interior. Because the door panel 201 is made of resin serving as the non-conductive material, the detection range 205 is formed at the area outside of the door panel 201 while the capacitive sensor 204 is hidden from the outside.

As illustrated in FIGS. 2 and 5, the non-contact detection sensor 204 is provided at the belt molding 104 or the dent portion 501 so as to reduce the wrong detection while the detection range in the non-contact manner is expanded. At each area at which the non-contact detection sensor 204 is provided in the aforementioned manner, a void is formed between the outermost position 206 of the side door 101 and an end surface of the side door 101. The aforementioned void is formed at the inner side of the vehicle 100 than the outermost position 206 serving as the portion of the side door 101. Thus, as mentioned above, the void corresponds to the area to which the user is not expected to place one's hand without intention and at which possibility of presence of the user's hand, for example, is low, while a certain size or dimension may be ensured as the detection range 205 in the non-contact manner. The aforementioned void is also applicable and obtained in a case where the non-contact detection sensor 204 is provided at the pillar, for example, at the center pillar 103.

Next, a second embodiment will be explained. In the first embodiment, the capacitive sensor is used as the non-contact detection sensor 204. Nevertheless, the non-contact detection sensor 204 is not limited to the capacitive sensor and may be an optical sensor, a heat sensor, an ultrasonic sensor, or a system of image recognition by a camera, for example, as long as the non-contact detection is achieved and the detection range is specified to the inner side than the outermost position of the vehicle at the side at which the detection range extends. In the second embodiment, an optical sensor detecting a change in light is used as the non-contact detection sensor 204. In the following, the non-contact detection sensor 204 may be also referred to as the optical sensor 204.

Figure 6A:
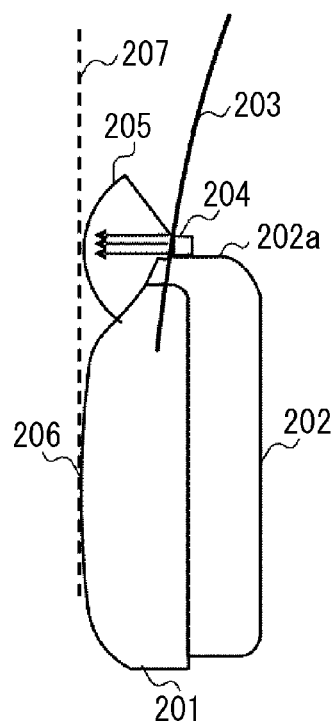
FIGS. 6A and 6B are schematic views each illustrating a cross-section of a side door according to a second embodiment disclosed here.
Figure 6B:
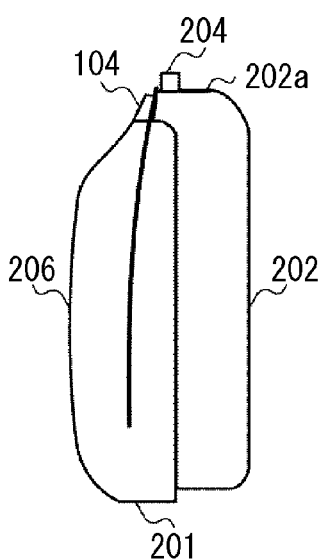

FIG. 6A is a cross-sectional view of the side door 101 in a fully closed state of the window glass 203. FIG. 6B is a cross-sectional view of the side door 101 in a fully open state of the window glass 203. As illustrated in FIGS. 6A and 6B, the optical sensor 204 is provided at an upper end 202a of the door trim 202 at an opposite side of a wheel of the vehicle 100. Specifically, as illustrated in FIG. 6A, the optical sensor 204 is provided at the inside of the vehicle interior in the fully closed state of the window glass 203. According to the present embodiment, the upper end 202a of the door trim 202 is positioned at the same height as the belt molding 104 or higher than the belt molding 104 in a state where the belt molding 104 is assembled on the side door 101. Therefore, the optical sensor 204 is inhibited from being hidden by the belt molding 104. The optical sensor 204 may excellently output light ray for detection towards the outside of the vehicle interior and may excellently input predetermined light from the outside of the vehicle interior.

According to the present embodiment, the optical sensor 204 detects an object within the detection range 205 in the non-contact manner by irradiating light, for example, infrared light, to the outside of the vehicle interior. Therefore, in a case where the window glass 203 is fully closed, the optical sensor 204 irradiates the light for detection towards the outside of the vehicle interior through the window glass 203 and detects the light input from the outside of the vehicle interior through the window glass 203.

In the present embodiment, the optical sensor 204 is provided at the inside of the vehicle interior. Thus, in the fully closed state of the window glass 203 as illustrated in FIG. 6A, the window glass 203 is positioned relative to the optical sensor 204 at the outer side of the vehicle interior, which makes difficult to see the optical sensor 204 from the outside of the vehicle interior. On the other hand, in the fully open state of the window glass 203 as illustrated in FIG. 6B, the optical sensor 204 is exposed to the outside of the vehicle interior. Nevertheless, because the optical sensor 204 is provided at the upper end 202a of the door trim 202, the optical sensor 204 may be easily mounted to the side door 101.

In addition, the optical sensor 204 is arranged at the inner side relative to the window glass 203 (i.e., at the vehicle interior side). Thus, adhesion of contamination such as rainfall, dust, dirt and mud, for example, as a cause for decreasing a sensing performance of the optical sensor 204 may be reduced.

Figure 7A:
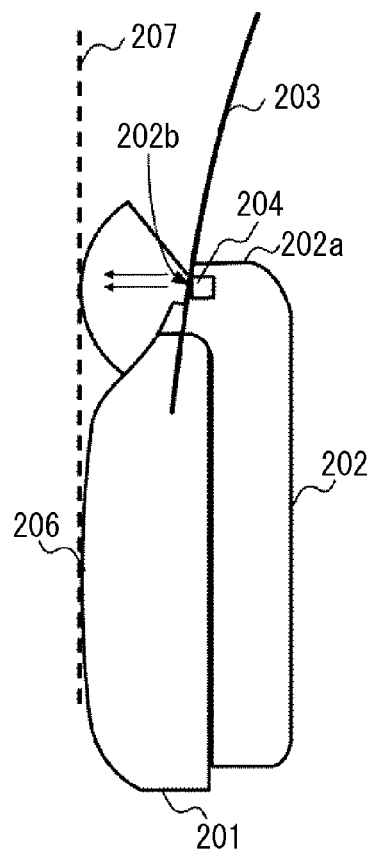
FIGS. 7A and 7B are schematic views each illustrating a cross-section of the side door according to a modified example of the second embodiment.
Figure 7B:
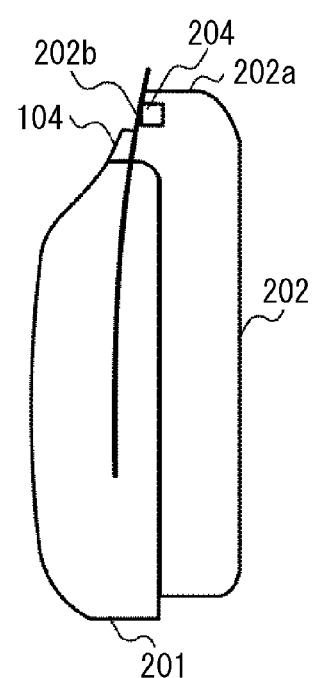

According to a modified example of the second embodiment, the optical sensor 204 may be incorporated within the door trim 202. FIG. 7A is a cross-sectional view of the side door 101 in a fully closed state of the window glass 203. FIG. 7B is a cross-sectional view of the side door 101 in a fully open state of the window glass 203. As illustrated in FIGS. 7A and 7B, the upper end 202a of the door trim 202 is positioned to be higher than the belt molding 104 in a state where the belt molding 104 is mounted to the side door 101. The optical sensor 204 is incorporated within a portion of the door trim 202 projecting from the belt molding 104. That is, a light emitting portion and a light receiving portion of the optical sensor 204 are hidden within the door trim 202. At this time, however, an opening portion 202b is provided at the door trim 202 so that the optical sensor 204 provided within the door trim 202 may output the light to the outside of the vehicle interior and input the light to the optical sensor 204 from the outside of the vehicle interior.

Accordingly, in the fully open state of the window glass 203 as illustrated in FIG. 7B, the optical sensor 204 is hidden by the window glass 203 so that the optical sensor 204 is difficult to be seen from the outside of the vehicle 100.

A third embodiment will be explained below. According to the first and second embodiments, the vehicle opening and closing member as a target that is automatically opened or closed by the user in the non-contact manner is the side door. Alternatively, the vehicle opening and closing member may be a back door or a trunk lid for a vehicle. In addition, the side door may be a swing door or a slide door. According to the third embodiment, the back door serves as the opening and closing member.

Figure 8:
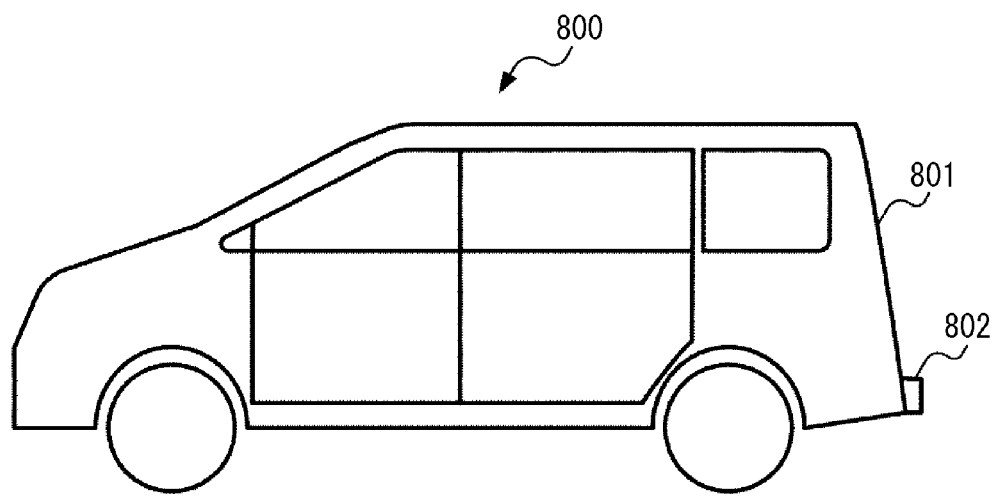
FIG. 8 is a side view of a vehicle according to a third embodiment disclosed here.
Figure 9:
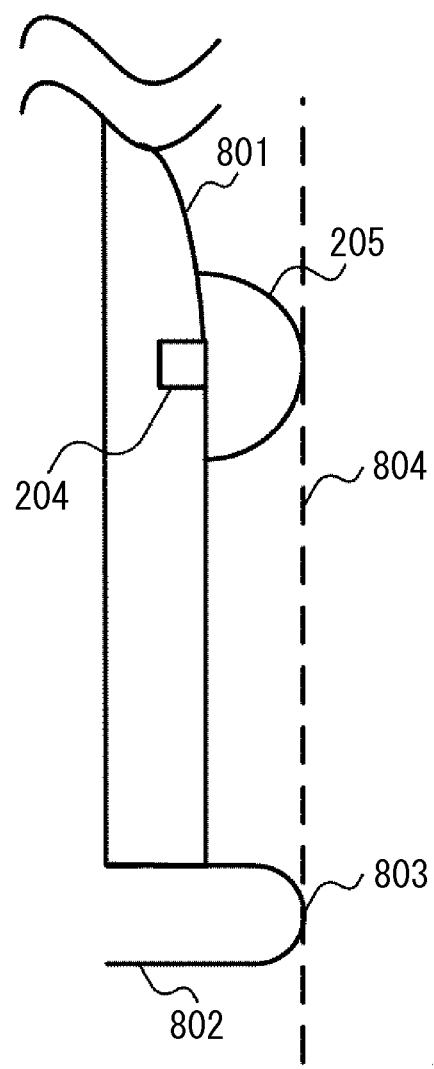
FIG. 9 is a schematic view illustrating a cross-section of a rear portion of the vehicle illustrated in FIG. 8 according to the third embodiment.

As illustrated in FIG. 8, a vehicle 800 includes a back door 801 and a bumper 802. As illustrated in FIG. 9, the capacitive sensor 204 is embedded in a resin-made door panel of the back door 801. The capacitive sensor 204 is embedded, for example, to an area at an upper side of a portion of the back door 801 at which a number plate is provided. According to the present embodiment, the detection range 205 of the capacitive sensor 204 is specified to the inner side than an outermost position 803 of the bumper 802. That is, the detection range 205 is specified to the inner side of an imaginary line 804 serving as a tangent line of the outermost position 803 of the bumper 802, i.e., to the side close to the back door 801.

As mentioned above, it is important to provide the non-contact detection sensor 204 including the capacitive sensor at the area which is visually confirmable by the user but to which the user is normally unlikely to place one's hand, for example. In the case of the vehicle 800 illustrated in FIG. 8, the member positioned at the outermost side in the vehicle 800 is the bumper 802. Thus, an area at the inner side than the outermost position 803 of the bumper 802 is an area to which the user is normally unlikely to place one's hand.

According to the aforementioned embodiments, it is not essential to arrange the outermost position for specifying the detection range 205 to the outermost position of the side door or the outermost position of the bumper. In the embodiments, the command for starting the automatic opening and closing operation is configured to be input to the vehicle by the user in the non-contact manner at the inner side of a portion of the vehicle positioned at the outermost side at a side portion of the vehicle, for example, at a front surface, a rear surface, or a side surface of the vehicle, at which a structural member, for example, the opening and closing member such as the side door and the back door, or the pillar, to which the non-contact detection sensor is mounted is provided to face. Therefore, the non-contact detection sensor 204 that achieves the non-contact detection is configured not to detect the outside of the portion of the vehicle that is positioned at the outermost side in a direction where the surface of the opening and closing member in the closed state faces (i.e., the outer side than the outermost position of the back door or the bumper) in the closed state of the opening and closing member. That is, the detection range of the non-contact detection sensor is specified to the inner side of the outermost position of the vehicle in the direction towards the outer side of the vehicle interior from the opening and closing member as a target for the automatic opening and closing operation. For example, according to the first and second embodiments, the outermost position 206 of the side door 101 is the outermost position in the direction towards the outside of the vehicle interior from the side door 101 serving as the opening and closing member and as a target for the automatic opening and closing operation. According to the third embodiment, the outermost position 803 of the bumper 802 is the outermost position in the direction towards the outside of the vehicle interior from the back door 801 serving as the opening and closing member and a target for the automatic opening and closing operation.

Figure 10:
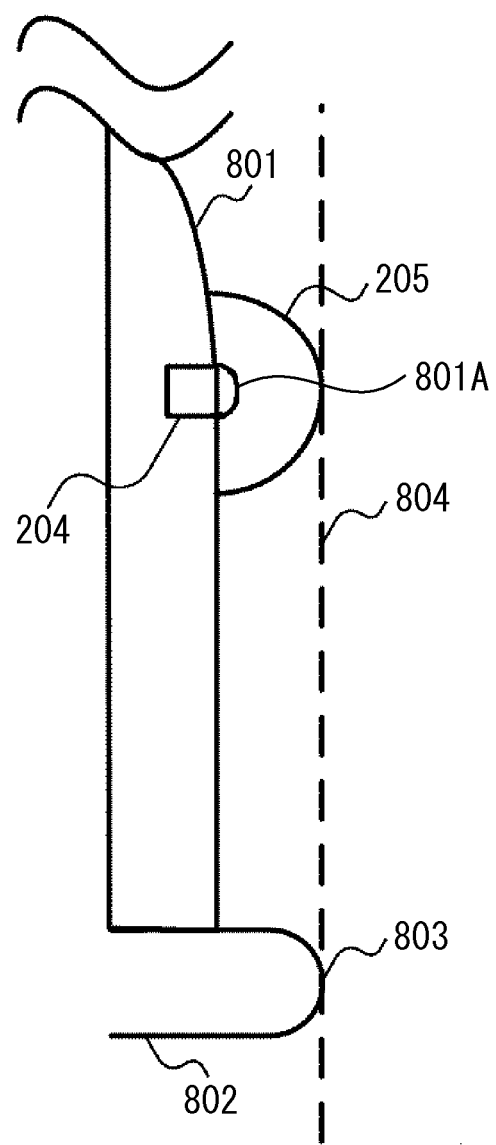
FIG. 10 is a schematic view illustrating a cross-section of the rear portion of the vehicle according to a modified example of the third embodiment.

The third embodiment may be modified as illustrated in FIG. 10. Specifically, according to a modified example of the third embodiment, the capacitive sensor 204 is provided at an emblem 801A serving as a decorative member of the back door 801. At this time, the capacitive sensor 204 is desirably integrally formed at the emblem 801A. Alternatively, the capacitive sensor 204 embedded in the back door 801 may be covered by an emblem as a separate member from the capacitive sensor 204 so as not to be seen from the outside of the vehicle 800. In the modified example of the third embodiment, the door panel of the back door 801 may be made of resin or metal. In addition, the capacitive sensor 204 may be provided at a decorative member other than the emblem 801A.

According to the aforementioned first to third embodiments, the wrong operation of the door 101, 801 of the vehicle 100, 800 in the non-contact manner may be reduced and the opening and closing operation of the door 101, 801 may be easily performed.

According to the first and third embodiments, the non-contact detection sensor 204 is the capacitive sensor, the capacitive sensor being covered by a non-conductive member from an outside of the vehicle interior of the vehicle 100, 800.

In addition, according to the second embodiment, the non-contact detection sensor 204 is the optical sensor.

Further, according to the first and second embodiments, the opening and closing member is the side door 101.

Furthermore, according to the first and second embodiments, the detection range 205 is configured to be specified to the inner side than the outermost position 206 of the side door 101.

Furthermore, according to the first embodiment, the non-contact detection sensor 204 is mounted to the belt molding 104.

Furthermore, according to the first embodiment, the non-contact detection sensor 204 is mounted to the center pillar 103.

Furthermore, according to the first embodiment, the side door 101 includes the door panel 201, the window glass 203 configured to open and close, and the dent portion 501 formed at an area at which the window glass 203 of the door panel 201 is provided and including a thickness that is gradually decreasing towards the window glass 203, the non-contact detection sensor 204 being configured to be arranged at the dent portion 501.

Furthermore, according to the third embodiment, the opening and closing member is the back door 801.

Furthermore, according to the third embodiment, the detection range 205 is configured to be specified to the inner side than the outermost position 803 of the bumper 802 provided at a rear portion of the vehicle 800.

Furthermore, according to the second embodiment, the opening and closing member is the side door 101, and the optical sensor 204 is provided at the inside of the vehicle interior relative to the window glass 203 of the side door 101.

Furthermore, according to the second embodiment, the optical sensor 204 includes a light emitting portion and a light receiving portion, the light emitting portion and the light receiving portion being hidden by the window glass 203 relative to the outside of the vehicle interior in a state where the window glass 203 is fully opened.

Furthermore, according to the first embodiment, the structural member is the side door 101, the side door 101 including the door panel 201, the window glass 203 configured to open and close, and the dent portion 501 formed at an area at which the window glass 203 of the door panel 201 is provided and including a thickness that is gradually decreasing towards the window glass 203, the non-contact detection sensor 204 being arranged at the dent portion 501.

Furthermore, according to the first embodiment, the non-contact detection sensor 204 is covered by the belt molding 104 from the outside of the vehicle interior of the vehicle 100.

Furthermore, according to the first embodiment, the non-contact detection sensor 204 is integrally formed at the belt molding 104.

Furthermore, according to the third embodiment, the non-contact detection sensor 204 is provided at the emblem 801A that is attached to the back door 801.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic opening and closing apparatus of an opening and closing member for a vehicle, comprising:

an opening and closing member driving portion configured to automatically open and close the opening and closing member mounted at the vehicle;

a receiving portion configured to receive a radio signal transmitted from a radio transmitter and indicating identification information for identifying the vehicle;

a non-contact detection sensor configured to detect an object in a non-contact manner and including a detection range that is specified to an inner side relative to an outermost position of the vehicle in a direction towards an outer side of a vehicle interior of the vehicle from the opening and closing member in a state where the opening and closing member is closed;

a control portion controlling the opening and closing member driving portion;

the control portion configured to control the opening and closing member driving portion in a case where the non-contact detection sensor detects an object in a state where the identification information is correlated to the vehicle on a basis of the radio signal received from the radio transmitter; and a detection direction of the non-contact detection sensor being toward an outside of the vehicle and extending obliquely upward of a horizontal axis of the vehicle.

2. The automatic opening and closing apparatus of the opening and closing member according to claim 1, wherein the non-contact detection sensor is a capacitive sensor, the capacitive sensor being covered by a non-conductive member from an outside of the vehicle interior of the vehicle.

3. The automatic opening and closing apparatus of the opening and closing member according to claim 1, wherein the non-contact detection sensor is an optical sensor.

4. The automatic opening and closing apparatus of the opening and closing member according to claim 3, wherein the opening and closing member is a side door, and the optical sensor is provided at an inside of the vehicle interior relative to a window glass of the side door.

5. The automatic opening and closing apparatus of the opening and closing member according to claim 4, wherein the optical sensor includes a light emitting portion and a light receiving portion, the light emitting portion and the light receiving portion being hidden by the window glass relative to an outside of the vehicle interior in a state where the window glass is fully opened.

6. The automatic opening and closing apparatus of the opening and closing member according to claim 1, wherein the opening and closing member is a side door.

7. The automatic opening and closing apparatus of the opening and closing member according to claim 6, wherein the detection range is configured to be specified to an inner side relative to an outermost position of the side door.

8. The automatic opening and closing apparatus of the opening and closing member according to claim 6, wherein the non-contact detection sensor is mounted to a belt molding.

9. The automatic opening and closing apparatus of the opening and closing member according to claim 6, wherein the side door includes a door panel, a window glass configured to open and close, and a dent portion formed at an area at which the window glass of the door panel is provided and including a thickness that is gradually decreasing towards the window glass, the non-contact detection sensor being configured to be arranged at the dent portion.

10. The automatic opening and closing apparatus of the opening and closing member according to claim 1, wherein the non-contact detection sensor is mounted to a pillar.

11. The automatic opening and closing apparatus of the opening and closing member according to claim 1, wherein the opening and closing member is a back door.

12. The automatic opening and closing apparatus of the opening and closing member according to claim 11, wherein the detection range is configured to be specified to an inner side relative to an outermost position of a bumper provided at a rear portion of the vehicle.

13. The automatic opening and closing apparatus of the opening and closing member according to claim 11, wherein the non-contact detection sensor is provided at an emblem that is attached to the back door.

14. An automatic opening and closing apparatus of a door for a vehicle, comprising:
- a door driving portion configured to automatically open and close the door mounted to the vehicle;
- a receiving portion configured to receive a radio signal transmitted from a radio transmitter and indicating identification information for identifying the vehicle;
- a non-contact detection sensor configured to detect an object in a non-contact manner and including a detection range that is limited to an inner side relative to an outermost position of the vehicle in a direction towards an outer side of the vehicle from the door when the door is closed;
- a control portion configured to control the door driving portion when (i) the non-contact detection sensor detects an object and (ii) the identification information is correlated to the vehicle based on the radio signal received from the radio transmitter;
- the door including a door trim and a window glass, and including a belt molding mounted to the door;
- the non-contact detection sensor incorporated within an upper end of the door trim;
- the upper end of the door trim being positioned higher than the belt molding; and
- the non-contact detection sensor is hidden by the window glass in a fully open state of the window glass.

* * * * *